United States Patent
Braeuchle et al.

(10) Patent No.: US 6,859,143 B2
(45) Date of Patent: Feb. 22, 2005

(54) METHOD, COMPUTER PROGRAM, CONTROL APPARATUS AND ARRANGEMENT FOR DETECTING THE TOUCH CONTACT OF AN OPERATOR-CONTROLLED ELEMENT AS WELL AS THE OPERATOR-CONTROLLED ELEMENT

(75) Inventors: Goetz Braeuchle, Reichartshausen (DE); Martin Heinebrodt, Stuttgart (DE); Juergen Boecker, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/258,127
(22) PCT Filed: Feb. 12, 2002
(86) PCT No.: PCT/DE02/00488
  § 371 (c)(1),
  (2), (4) Date: Dec. 4, 2002
(87) PCT Pub. No.: WO02/066287
  PCT Pub. Date: Aug. 29, 2002

(65) Prior Publication Data
  US 2003/0144801 A1 Jul. 31, 2003

(30) Foreign Application Priority Data
  Feb. 19, 2001 (DE) .......................................... 101 07 699

(51) Int. Cl.⁷ .............................................. G08B 23/00
(52) U.S. Cl. ........................ 340/576; 340/575; 180/272
(58) Field of Search ................................ 340/575, 576; 180/272

(56) References Cited

U.S. PATENT DOCUMENTS

| | | | |
|---|---|---|---|
| 5,172,785 A | 12/1992 | Takahashi ..................... 180/141 |
| 5,404,128 A | * 4/1995 | Ogino et al. ............. 340/425.5 |
| 5,465,079 A | * 11/1995 | Bouchard et al. ........... 340/576 |
| 5,815,070 A | 9/1998 | Yoshikawa ................... 340/439 |
| 6,087,942 A | * 7/2000 | Sleichter et al. ............ 340/576 |
| 6,184,785 B1 | 2/2001 | Midorikawa ............. 340/457.1 |
| 6,198,397 B1 | 3/2001 | Angert et al. ............... 340/576 |

FOREIGN PATENT DOCUMENTS

| | | | |
|---|---|---|---|
| DE | 41 16 757 | 8/1992 | |
| DE | 44 29 064 | 11/1995 | |
| DE | 195 18 914 | 12/1995 | |
| DE | 195 45 848 | 6/1997 | |
| DE | 195 47 842 | 6/1997 | |
| DE | 196 30 769 | 2/1998 | |
| DE | 196 43 593 | 4/1998 | |
| ES | 2 021 915 | 11/1991 | ........... B60K/21/00 |
| JP | 4-183439 | 6/1992 | |
| JP | 2001 163131 | 6/2001 | ........... B60R/21/00 |

OTHER PUBLICATIONS

Feb. 3, 2004—http://www2.sfu.ca/sonic–studio/handbook/Infrasonic.html.*
Feb. 3, 2004—http://www2.sfu.ca/sonic–studio/handbook/Audio_Frequency.html.*

* cited by examiner

Primary Examiner—Jeffery Hofsass
Assistant Examiner—Jennifer Stone
(74) Attorney, Agent, or Firm—Walter Ottesen

(57) ABSTRACT

A method serves for detecting the touch contact of an operator-controlled element of a machine by a user. In order to be able to continuously and with great safety and meaning carry out the detection, it is suggested that an actual vibration characteristic (FR) of the operator-controlled element is detected during operation, which changes in dependence upon a touch contact of the operator-controlled element by a user, and is compared to at least one desired vibration characteristic (FR0), which is present in a defined state of the operator-controlled element (34, 42), and an announcement (48, 52) takes place in dependence upon the result of the comparison.

28 Claims, 6 Drawing Sheets

METHOD, COMPUTER PROGRAM, CONTROL APPARATUS AND ARRANGEMENT FOR DETECTING THE TOUCH CONTACT OF AN OPERATOR-CONTROLLED ELEMENT AS WELL AS THE OPERATOR-CONTROLLED ELEMENT

This application is a 371 of PCT/DE02/00488 Feb. 12, 2002.

FIELD OF THE INVENTION

The present invention relates first to a method for detecting the touch contact of an operator-controlled element of a machine by a user.

BACKGROUND OF THE INVENTION

Such a method is known from DE 195 18 914 A1. In order to be able to detect a tiring of a driver of an automobile and the effects as to perception and reaction related thereto, this publication suggests mounting a "multi-contact band" on the steering wheel of the motor vehicle, which comprises numerous individual switches. If none of the switches is pressed by the user during a specific time span, a warning signal sounds. In this known arrangement, the user is therefore compelled to actively press a switch at specific intervals. Otherwise, he will be "awakened" by a warning signal, for example, by a horn device.

JP 4183439 A1 further discloses an arrangement wherein electrodes are mounted on the steering wheel. If the driver touches the steering wheel in the region of the electrodes, then an electrocardiogram is generated. From the evaluation of the electrocardiogram, a reduced alertness or a falling-asleep of the driver are detected.

The known methods have, however, various disadvantages. With a contact band, for example, a check of the alertness of the driver and the position of his hands on the steering wheel is possible only at time intervals, but not continuously. An electrocardiogram, in turn, requires an electric contact between hand and steering wheel which is often not present. Modern vehicles in ever increasing numbers include systems which support the driver while steering the vehicle or support the driver in special driving maneuvers. In these systems, it is necessary for reasons of safety that the driver has his hands tightly on the steering wheel in such a manner that he always has full control over the vehicle and the responsibility for the steering of the vehicle. In the case of an automatic steering support, this is also necessary when, for a time (like when driving straight ahead), no steering intervention by the driver is necessary.

SUMMARY OF THE INVENTION

The present invention therefore has the task to provide a method with which the determination can be made continuously and with high reliability as to whether the driver has both hands on the steering wheel.

This task is solved in a method of the kind mentioned initially herein in that an actual vibration characteristic of the operator-controlled element (which changes in dependence upon a touch contact of the operator-controlled element by a user) is detected during operation and is compared to at least one desired vibration characteristic, which is present in a defined state of the operator-controlled element, and an announcement is made in dependence upon the result of the comparison.

As in every body, the vibration characteristic in an operator-controlled element of a machine is dependent upon the oscillating mass and its mounting. If the user grabs the operator-controlled element, the oscillating mass changes and therefore also the oscillating characteristic of the operator-controlled element. Depending upon the intensity with which the operator-controlled element is grasped by the user and depending upon the muscle force which the user applies, the holding tight of the steering wheel by the hand of the user can function as an additional support which, likewise, changes the oscillating characteristic of the operator-controlled element.

Accordingly, the vibration characteristics of an operator-controlled element of a machine are therefore a physical characteristic which is very well suited to the continuous detection of a touch contact of the operator-controlled element by the user. In this connection, it is insignificant in what form the user touches the operator-controlled element. Even when the user is, for example, wearing gloves or the operator-controlled element is wound, for example, with a leather band, the vibration characteristic of the operator-controlled element changes with a touch. From the detection of the change of the vibration characteristic of the operator-controlled element, a detection of the contact state of the operator-controlled element by the user is possible in every situation. The detection takes place without the emission of electromagnetic waves and/or delay. In the simplest case, the detection of the change can take place via a comparison of actual values to a threshold value.

A first improvement shows that the vibration characteristic is the propagation characteristic of excited vibrations along at least one region of the operator-controlled element. The propagation characteristic of vibrations along the operator-controlled element is also changed by a touch contact of the operator-controlled element by a user. This is connected to the fact that the damping of vibrations, which propagate along the operator-controlled element, are dependent upon the support and the oscillating mass of the operator-controlled element. This, in turn, changes with a touch contact by the user.

Here it is especially preferred that the operator-controlled element be excited by a vibrating pulse and the time-dependent intensity profile of the response vibrations is detected. Such a vibration excitation is technically easily realizable. The determination of a touch contact of the operator-controlled element can also be carried out very simply in this way. In the simplest case, the time-dependent intensity profile of the response vibrations is stored for the case in which no touch contact of the operator-controlled element takes place and this desired intensity profile is compared to the actual intensity profile. For a coincidence, one can assume that the user is not in touch contact with the operator-controlled element; whereas, from a difference between the two intensity profiles, a conclusion can be drawn as to a touch contact of the operator-controlled element, for example, by the hand of the user.

It is also possible that the oscillating characteristic is a resonance frequency of the operator-controlled element. The resonance frequency of a body also changes in dependence upon the oscillating mass and its support because the arrangement of the vibration antinodes and the vibration nodes on the operator-controlled element changes. The detection of the actual resonance frequency of the operator-controlled element and its comparison to a desired resonance frequency is technically simple to realize.

For example, it is conceivable that at least one region of the operator-controlled element is excited in resonance. The actual resonance frequency of the operator-controlled element is detected in that the excitation frequency varies and the maximum of the power output and/or the minimum of the power input is detected. This improvement of the method of the invention is based on the idea that there is a power amplification in the region of the resonance of a body. For the same initial power (that is, in the present case, for the same vibration amplitude on the operator-controlled element), a lower power input is required in the region of the resonance frequency of the operator-controlled element than outside of the resonance frequency. Oppositely, a specific power input in the region of the resonance frequency results in a higher vibration amplitude than outside of the resonance frequency.

Accordingly, with this method, the actual resonance frequency of the operator-controlled element can be determined in a simple manner by scanning a specific frequency range. If this actual resonance frequency is compared to the desired resonance frequency (which, for example, corresponds to the resonance frequency in a state of the operator-controlled element wherein this element is free of a touch contact by the user), the actual touch contact situation can be detected therefrom in a simple manner. That improvement of the method of the invention also points in this direction wherein the operator-controlled element is excited at a constant frequency and a change of the necessary power input or the received power output and/or a shift of the phase position between excitation and response is detected.

It is furthermore provided that a conclusion is drawn as to the intensity and/or the nature of the touch contact from the extent and/or nature of the deviation of the actual vibration characteristic from the desired vibration characteristic. In this improvement of the method of the invention, it can, for example, be detected as to whether the user touch contacts the operator-controlled element with one hand or with both hands. Furthermore, it can even be detected whether the user grasps the operator-controlled element only loosely or with a "tight hand".

In an especially advantageous improvement of the method of the invention, it is provided that the desired vibration characteristic is detected and stored in a state of guaranteed non-contact of the operator-controlled element by the user. It is possible, for example, to detect when the user approaches the machine or the operator-controlled element but does not yet touch the same and to then detect the desired vibration characteristic and to store the same. In this way, for example, temperature effects or changes undertaken by the user on the operator-controlled element can be considered and reliably compensated such as the mounting of parts with adhesive, et cetera.

In another improvement, it is suggested that the announcement include the setting of a bit and/or a flag. This software measure makes possible a reaction in the safety-relevant systems of the vehicle. In this way, an automatic safety measure is possible when the user releases the operator-controlled element and the machine is therefore without guidance. This is made manifest also in that improvement wherein the announcement effects an intervention by an autopilot and/or the output of a warning and/or an alarm. With the output of a warning and/or an alarm, the user is additionally advised as to the possible safety-endangering condition.

Here it is especially preferred that the warning and/or alarm include the output of an acoustic signal, an optical signal and/or the generation of sensoric stimuli especially of vibrations on the operator-controlled element (the detection of vibrations on the operator-controlled element, of course, has as a condition precedent that the user at least still loosely contact touches the operator-controlled element).

It is also possible that the vibration characteristics are detected in the ultrasonic range and/or in the infrasonic range or corresponding vibrations are generated. Such vibrations cannot be heard by persons and also cannot be felt so that they do not affect the operation of the machine.

In order to reduce the installation complexity, the excitation of the vibrations of the operator-controlled element and the detection of the vibration characteristics can take place with the same device, especially a piezo transducer.

The invention also relates to a computer program, which is suitable for carrying out the above method when it is executed on a computer. Here, it is especially preferred when the computer program is stored on a memory and especially on a flash memory.

Furthermore, the invention relates to a control apparatus (open loop and/or closed loop) for detecting the touch contact of an operator-controlled element of a machine by a user. In order to ensure a reliable operation of the machine, it is suggested that the control apparatus is suitable for carrying out the above method. Here, it is especially preferred that the control apparatus be provided with a computer program of the above kind.

The invention relates also to an arrangement for detecting the touch contact of an operator-controlled element of a machine by a user with a detection arrangement which is connected to the operator-controlled element and which responds to a touch contact of the operator-controlled element by a user.

In order to be able to continuously and reliably detect the touch contact state of the operator-controlled element by the user (which, in turn, makes it possible to detect a "driverless" condition of the machine and to initiate corresponding measures), it is suggested that the detection device is so configured that it detects an actual vibration characteristic of the operator-controlled element during operation, which actual vibration characteristic changes in dependence upon a touch contact of the operator-controlled element by a user; and, that a data processing unit is provided, which compares the signal of the detection unit to a desired vibration characteristic which is present in a defined state of the operator-controlled element and outputs an announcement in dependence upon the result of the comparison.

Such an arrangement operates with high reliability and permits a continuous monitoring of the contact state of the operator-controlled element by the user. Here, it also applies that the desired vibration characteristic can also simply be a maximum permissible value, that is, a threshold value.

The invention furthermore relates to an operator-controlled element of a machine, especially a steering wheel of a motor vehicle, which is connected to an arrangement of the above kind. Especially in motor vehicles, it is advantageous when it is monitored whether the driver has his hands on the steering wheel or not. If the driver removes his hands from the steering wheel (because he, for example, is not attentive or because he erroneously believes he can remove the hands from the steering wheel because of the presence of an automatic steering device), this can be detected or monitored with the operator-controlled element of the invention and a corresponding countermeasure can be initiated. It is also possible that the total arrangement is integrated into the operator-controlled element thereby saving space.

BRIEF DESCRIPTION OF THE DRAWING

The invention will now be explained with reference to the drawings wherein.

DESCRIPTION OF THE PREFERRED EMBODIMENTS OF THE INVENTION

Figure 1:
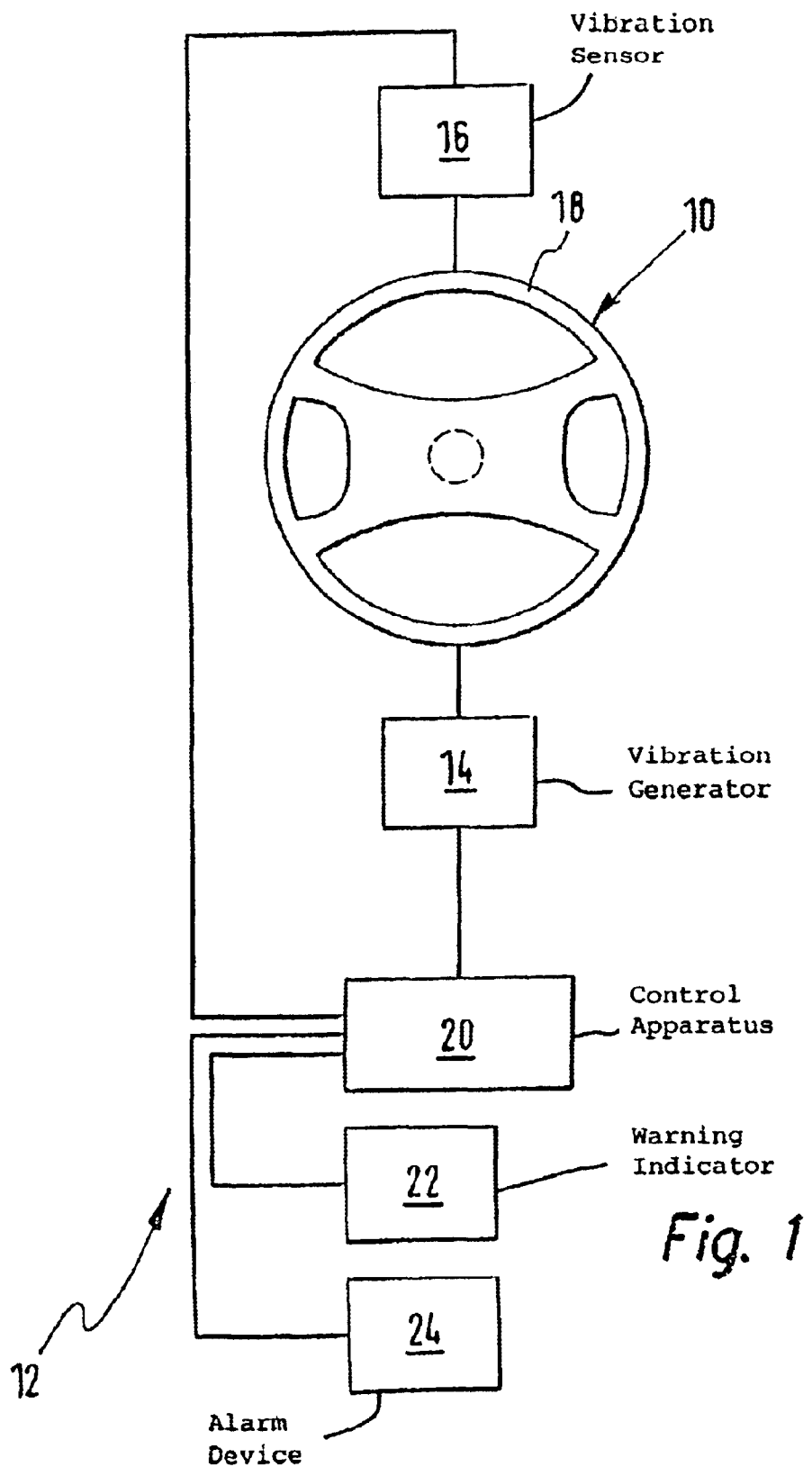
FIG. 1 shows a principal illustration of an arrangement for detecting the touch contact of a steering wheel of a motor vehicle by a driver.

In FIG. 1, an arrangement for detecting the touch contact of a steering wheel 10 of a motor vehicle (not shown) by a user has the reference numeral 12. The arrangement 12 includes a vibration generator 14 as well as a vibration sensor 16, which, in the present embodiment, are connected to a steering wheel ring 18 of the steering wheel 10 at locations lying diametrically opposite each other (it is understood that the vibration generator and the vibration sensor need not necessarily be mounted diametrically opposite each other but can be provided also at any desired relative positions). The vibration generator 14 is a piezo vibration generator. In an embodiment (not shown), the vibration generator and the vibration sensor are accommodated in a single device.

The vibration sensor 16 supplies signals to a control apparatus 20, which is connected at its output end to the vibration generator 14. Furthermore, a warning indicator 22 as well as an alarm device 24 are driven by the control apparatus 20. The warning indicator 22 and the alarm device 24 can, for example, be accommodated in the dashboard of the motor vehicle. The alarm device 24 can include a vibration generator (not shown), which causes the steering wheel 10 to vibrate when an alarm is triggered and these vibrations can be felt by the user on the hand.

Figure 2:
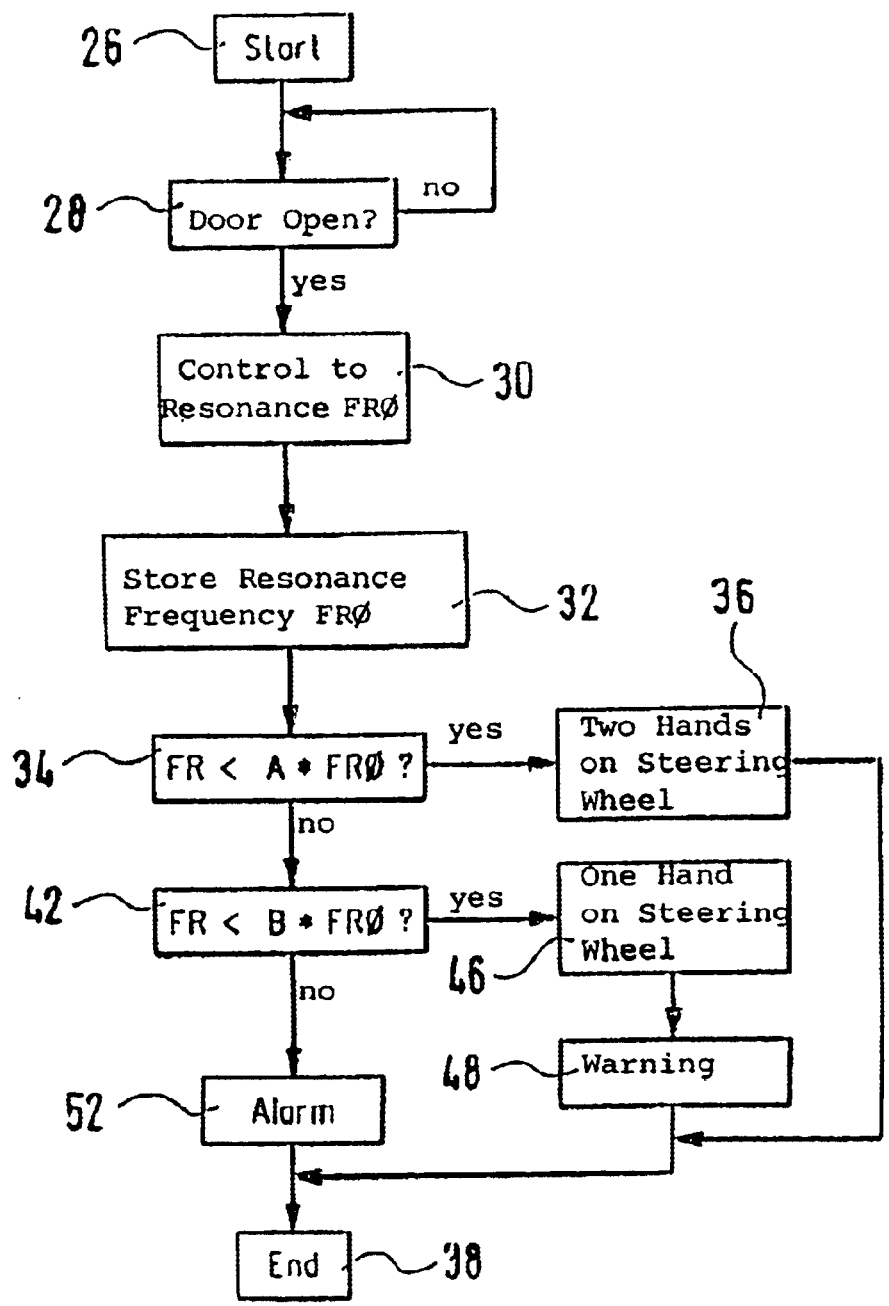
FIG. 2 is a flowchart of a first embodiment of a method for operating the arrangement of FIG. 1.

The arrangement 12 shown in FIG. 1 can be operated in accordance with a method, which is stored as a computer program in the control apparatus 20 and whose running sequence is shown in FIG. 2.

The method begins in a start block 26. In a block 28, a check is made as to whether the door of the motor vehicle is being opened. This can take place, for example, by monitoring the closing mechanism of the motor vehicle or of the interior space lamp of the motor vehicle. In an embodiment (not shown), not only an opening of the door but also a closing of the vehicle door is monitored.

If an opening of the door is determined in block 28, the vibration generator 14 is so driven in block 30 by the control apparatus 20 that the resonance frequency FR0 of the steering wheel ring 18 can be determined. This takes place in that the excitation frequency is varied and a detection is made when the signals, which are supplied by the vibration sensor 16, indicate a maximum amplitude. Alternatively, there could be a control to a constant signal intensity at sensor 16 and the input power at the generator 14 could be monitored. In the present embodiment, the vibration generator 14 operates at frequencies in the ultrasonic range. For this reason, this operation cannot be sensed or perceived by the user. However, an operation in the sound range which can be heard is also possible. One can proceed from the situation that the driver does not sit at the steering wheel during opening of the door of the motor vehicle and therefore does not touch contact the steering wheel 10 or the steering wheel ring 18 with the hands. For this reason, the resonance frequency FR0 is that resonance frequency, which is present in the state of non-contact of the steering wheel 10 by the user.

In block 32, the determined resonance frequency FR0 is stored. During operation of the motor vehicle, a check is made in block 34 as to whether the actual resonance frequency FR of the steering wheel ring 18 of the steering wheel 10 is less than a value which results from the multiplication of the stored resonance frequency FR0 and a constant factor A (A<1). If the answer in block 34 is yes, then one can assume that the driver has both hands on the steering wheel 10 (block 36). In this case, no measures are required so that the program jumps to end block 38.

Figure 3:
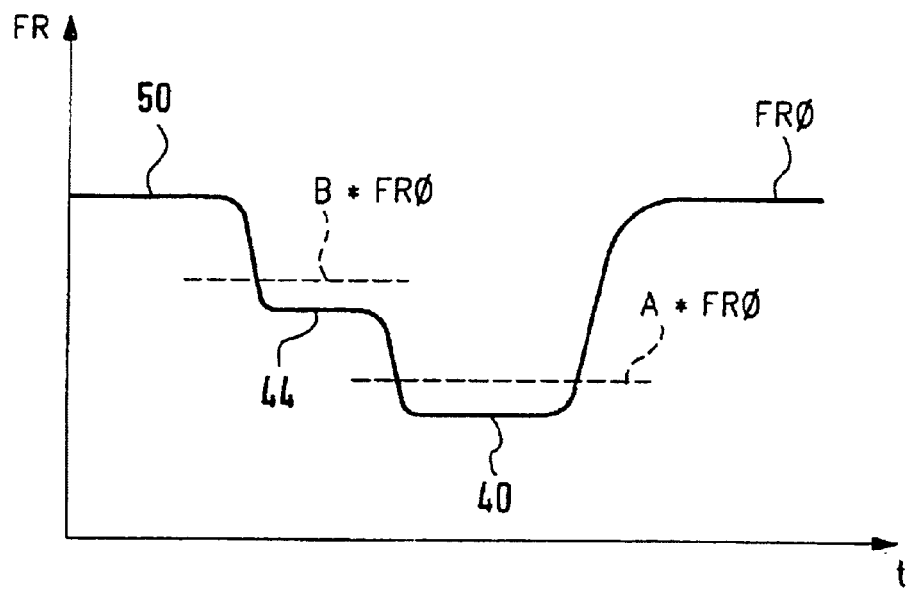
FIG. 3 is a diagram for explaining the method of FIG. 2.

This procedure is based on the idea that the oscillating mass is increased in total when the driver grabs the steering wheel ring with both hands. This means that the resonance frequency of this oscillating system is less than the resonance frequency FR0 of the steering wheel 10 or of the steering wheel ring 18 without a corresponding touch contact. The factor A is so selected that a positive answer to the inquiry in block 34 is only provided when the driver actually grabs the steering wheel ring 18 with his hands. In the diagram of FIG. 3, this corresponds to that region of the curve for the resonance frequency FR, which is identified by reference numeral 40.

The determination of the actual resonance frequency of the steering wheel ring 18 takes place in a like manner to the procedure in block 30, that is, that the excitation frequency of the vibration generator 14 is varied by the control apparatus 20 and, at the same time, the signals supplied by the vibration sensor 16 are evaluated in the control apparatus 20. Resonance is present at the maximum amplitude of the detected signals (a condition precedent is, of course, that the vibrations, which are generated by the vibration generator 14, have a constant amplitude).

If the answer in block 34 is no, that is, the actual resonance frequency FR lies above the value A multiplied by the resonance frequence FR0, then, in block 42, a check is made as to whether the actual resonance frequency FR is less than a value which results from the multiplication of the resonance frequency FR0 by a factor B (B<1, B>A). If the answer to the inquiry in block 42 is yes (which corresponds to a resonance frequency FR in the region 44 of the curve of FIG. 3), then one can assume that the driver has only one hand on the steering wheel ring 18 (block 46).

The above is based on the thought that, when only one hand of the driver touches the steering wheel ring 18, the mass of the oscillating system is less than in the case of a contact with both hands, but is greater than in a case without any contact. Correspondingly, the actual resonance frequency FR lies in a range between the frequency FR0 and the frequency used in block 34, which becomes manifest by the factor B. Accordingly, when the driver has only one hand on the steering wheel ring 18 (in specific driving situations, the safe guidance of the vehicle is endangered), a bit is set which leads to the output of a warning in block 48. The bit is only extinguished when the arrangement 12 recognizes that the driver again holds the steering wheel 18 with both hands.

If the answer in block 42 is no, this means that the actual resonance frequency FR lies in the range of the resonance frequency FR0 (reference numeral 50 in FIG. 3). One can therefore assume that the hands of the driver do not or at least do not to a sufficient extent contact the steering wheel ring 18. Even when the vehicle is equipped with an automatic steering support, the driver should always have the hands on the steering wheel 10. For this reason, an alarm is triggered (block 52) in this case. This alarm can include the following: the output of an acoustic signal; the output of an optical signal; or even the generation of sensoric stimuli on the steering wheel ring 18, especially vibrations. With this alarm 52, the driver is made unmistakably aware that it is necessary that he must grasp the steering wheel ring 18 with his hands in order to ensure the safety when steering the vehicle.

Figure 5:
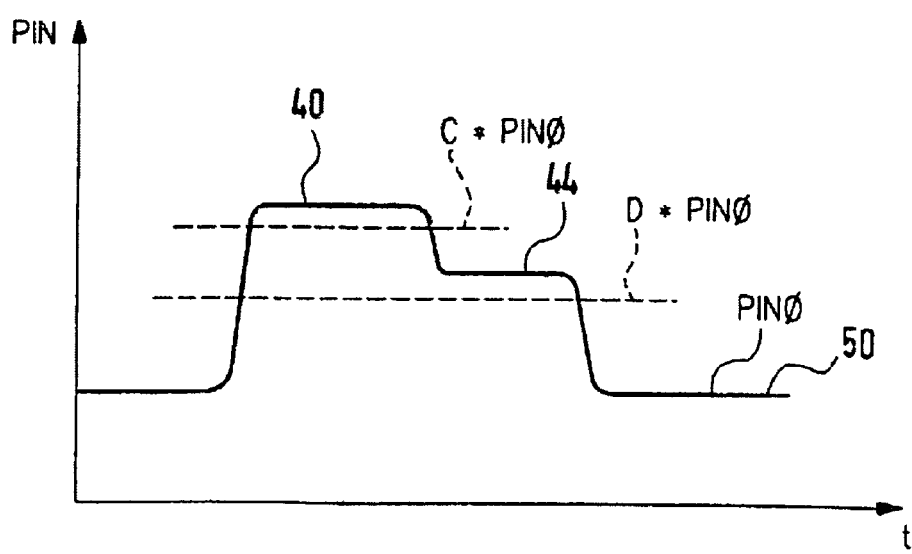
FIG. 5 is a diagram for explaining the method of FIG. 4.
Figure 4:
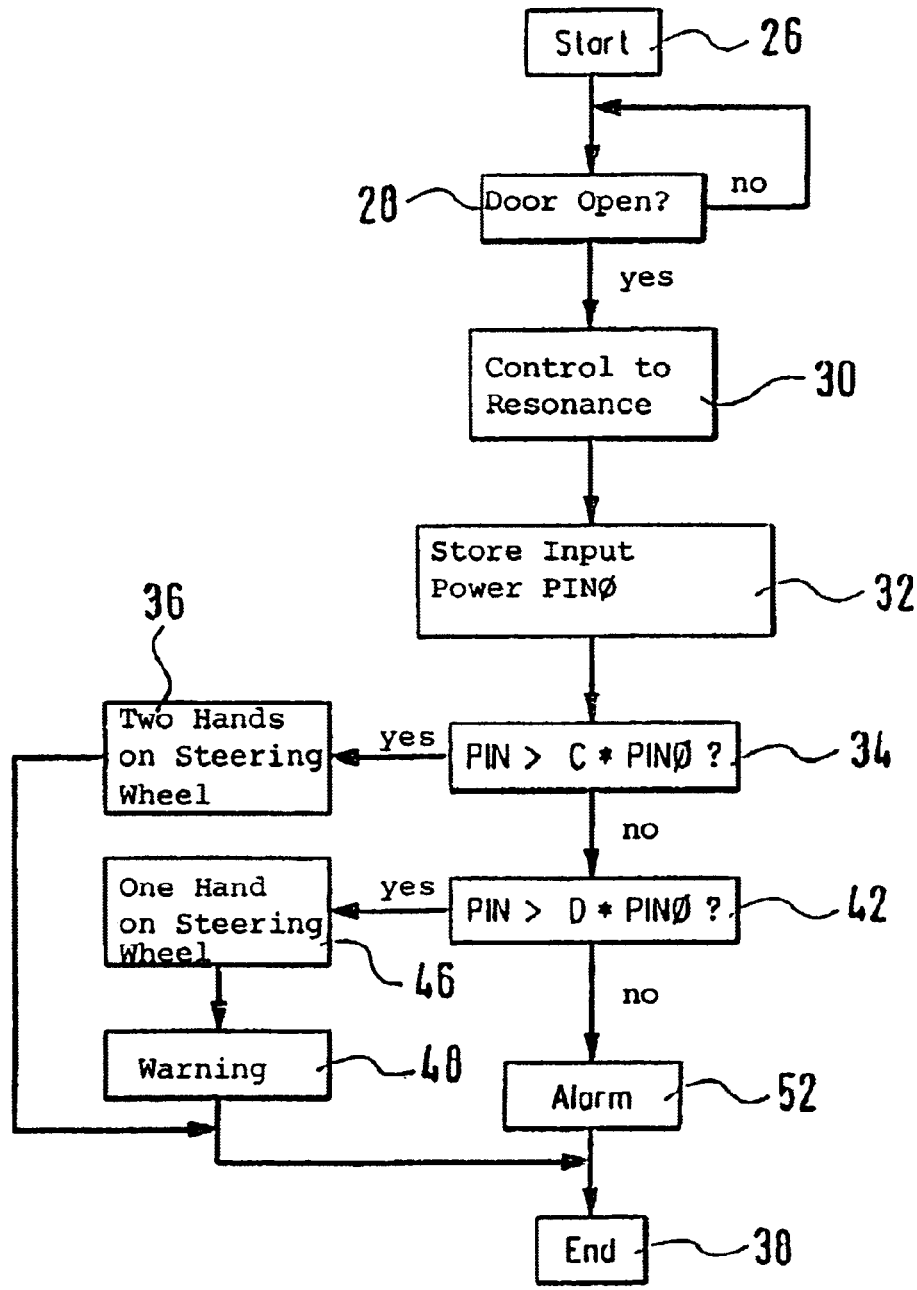
FIG. 4 is a flowchart of a second embodiment of a method for operating the arrangement of FIG. 1.

In FIGS. 4 and 5, a second embodiment is shown for a method for operating the arrangement 12 of FIG. 1. Such elements or blocks, which have the same or equivalent functions as in the embodiment shown in FIGS. 2 and 3, have the same reference numerals. These elements or blocks are, in part, not discussed in detail.

The embodiment, which is shown in FIGS. 4 and 5, distinguishes from the embodiment shown in FIGS. 2 and 3 in that the criterion for the detection of the contact situation is not the resonance frequency but the input power PIN at the vibration generator 14 required for obtaining a specific vibration amplitude. The resonance frequency is first determined in block 30 as in the embodiment described above and the input power PIN0 at the vibration generator 14, which is required for this resonance frequency, is stored in block 32.

Thereafter, the vibration generator 14 is so driven by the control apparatus 20 during operation that the frequency and the amplitudes of the vibrations, which are detected by the vibration sensor 16, remain constant. The input power PIN at the vibration generator 14, which is required for this purpose, is compared in block 34 to a limit value which results from the multiplication of the resonance input power PIN0 by a factor C (C>1).

If the required input power PIN is greater than this limit value, this means that a clearly higher input power PIN at the vibration generator 14 is required for generating a like vibration amplitude. This is, for example, then the case when the actual resonance frequency has changed, which is the case when the driver touches the steering wheel ring 18 with his hands. The factor C is so selected that one can assume in block 34 in the case of a positive answer that the driver holds the steering wheel 18 with both hands (block 36). This region is identified by reference numeral 40 in the diagram of FIG. 5.

If the required input power PIN lies below the limit value (which results from the factor C multiplied by the resonance input power PIN0), an inquiry is made in block 42 as to whether the required input power PIN is greater than a limit value, which results from the multiplication of the resonance input power PIN0 by a factor D (D>1, D<C). The factor D is so selected that, for a positive answer in block 42, one can assume that, even though not both hands of the driver are on the steering wheel, the driver however touches the steering wheel ring 18 with at least one hand. This is shown in block 46 in FIG. 4 as well as in the region 44 in FIG. 5.

When the driver holds the steering wheel 10 or the steering wheel ring 18 with only one hand, the driver cannot execute the required steering movements in all situations. For this reason, a warning is outputted here in block 48. If the change of the input power at the vibration generator 14, which is required for the generation of the above amplitude, is very slight or no change at all takes place, the answer in block 42 is no and an alarm is again triggered in block 52 (see also region 50 in FIG. 5).

Figure 6:
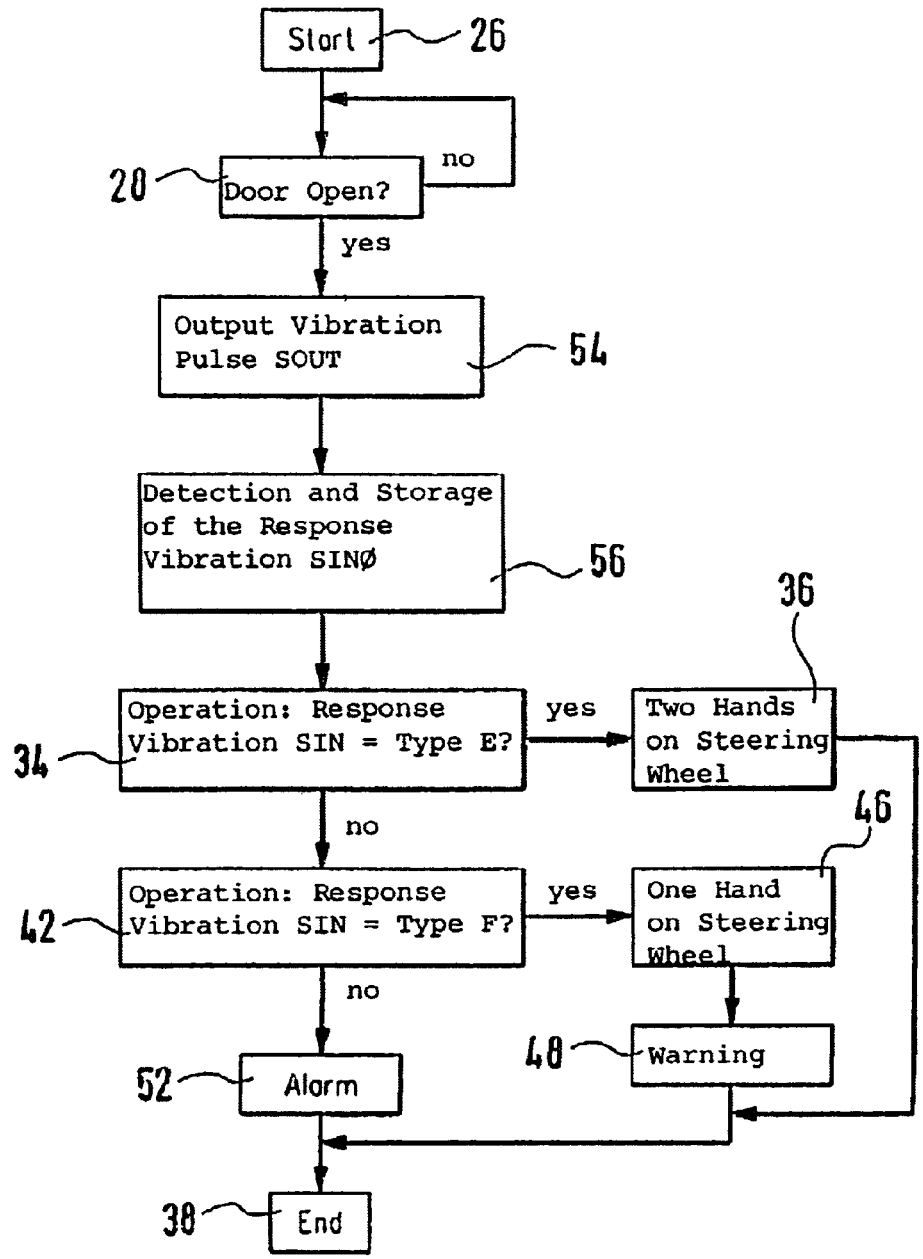
FIG. 6 is a flowchart of a third embodiment of a method for operating the arrangement of FIG. 1; and, FIGS. 7a to 7d are diagrams for explaining the method of FIG. 6.

In FIGS. 6 and 7, a third embodiment for a method for operating the arrangement 12 of FIG. 1 is shown. Here, it applies that such blocks, whose functions are equivalent to blocks of FIGS. 2 and 4, are provided with the same reference numerals and, in part, are not discussed in detail.

In contrast to the above-described embodiments, the steering wheel 10 or the steering wheel ring 18 is not excited to a resonance vibration in the method described in FIGS. 6 and 7. Instead, the vibration generator 14 is so driven by the control apparatus 20 that it outputs a single defined vibration pulse SOUT (block 54 in FIG. 6 as well as 7a).

Figure 7A:
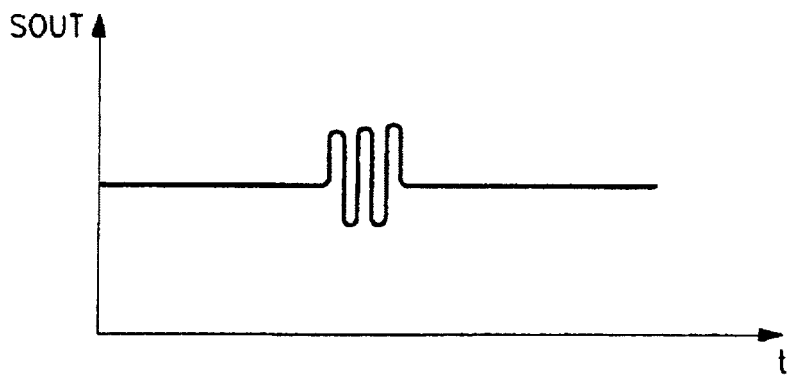
Figure 7B:
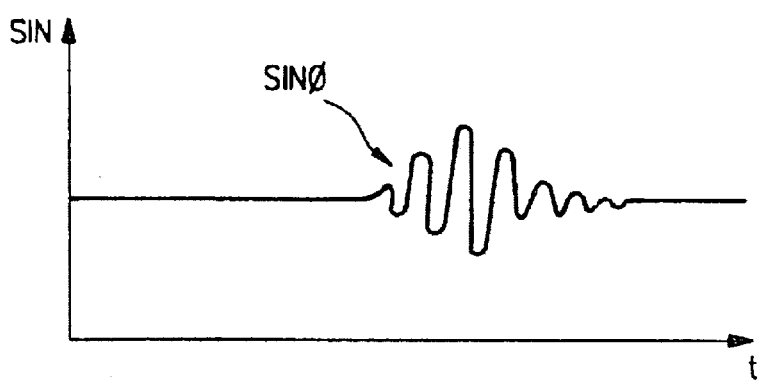

The vibration pulse SOUT continues in the steering wheel ring 18 and is reflected in part at the boundaries of the steering wheel ring 18 under some circumstances. The response vibration SIN is detected by the vibration sensor 16 and a corresponding signal is transmitted to the control apparatus 20. As in the above embodiments too, a detection of the response vibration SIN0 takes place first in a state wherein it is ensured that the user does not touch the steering wheel ring 18 of the steering wheel 10. The corresponding response vibration SIN0 is shown in FIG. 7b.

Figure 7C:
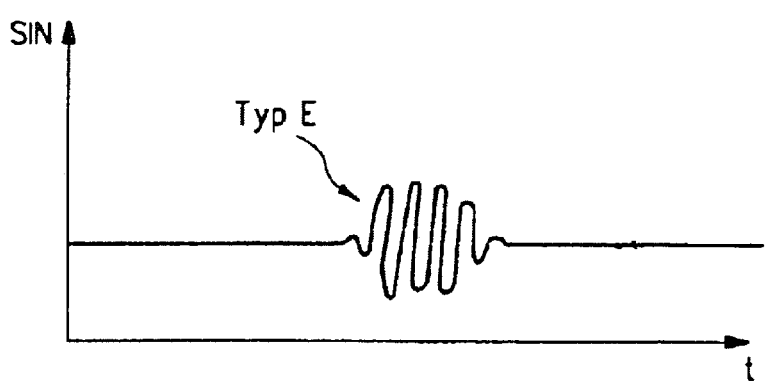
Figure 7D:
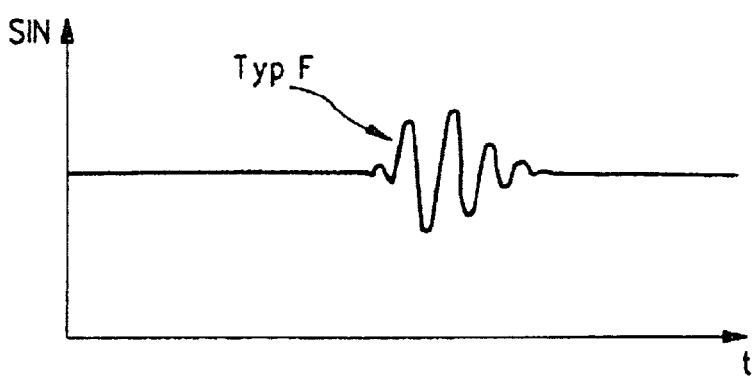

Various typical response vibrations SIN are stored in the control apparatus 20. When the user grasps the steering wheel ring 18, for example, with both hands, the attenuation of the vibration or the propagation characteristic is changed hereby so that the response signal, which is detected by the vibration sensor 16, exhibits a changed time-dependent intensity profile. An example for such a response vibration, as it typically occurs when the steering wheel ring 18 is grasped by both hands, is shown in FIG. 7c and is characterized as a response vibration of the type E. If the driver grasps the steering wheel ring 18 only with one hand, the damping is less intense and the propagation characteristic of the vibrations along the steering wheel ring is influenced with less intensity. The corresponding time-dependent intensity profile is shown in FIG. 7d and is characterized as type F.

In block 34, an inquiry is made as to whether the response vibration SIN, which is detected by the vibration sensor 16, corresponds approximately to type E, which is stored in the control apparatus 20. If the response in block 34 is yes, then it can be assumed that the driver has both hands on the steering wheel (block 36). Otherwise, an inquiry is made in block 42 as to whether the response vibration SIN corresponds to the type F stored in the control apparatus 20. If the response to this is yes, then it can be assumed that the driver touches the steering wheel ring 18 with one hand and, analogous to the above embodiments, a warning is outputted in block 48.

In the other case, it can be assumed that the driver has taken both hands from the steering wheel ring 18 of the steering wheel 10 and a corresponding alarm is generated in block 52 analogous to the above embodiments.

With all of the above-described arrangements 12 and the corresponding methods, it is therefore possible to reliably detect whether the driver of the motor vehicle holds the steering wheel ring 18 of the steering wheel 10 with both of his hands. Here, it is not only detectable whether a contact takes place at all but also the intensity and the nature of the contact can be determined. The operation of the arrangement 12 is not perceivable by the driver because the vibration generator 14 and the vibration sensor 16 operate in the ultrasonic range (in an embodiment not shown, an operation in the infrasonic range is also possible).

With the calibration of the desired vibration characteristic in blocks (30, 32) and (54, 56), respectively, it is furthermore possible to compensate situation-caused changes of the vibration characteristics of the steering wheel 10, for example, by temperature changes or by the winding of a leather band around the steering wheel ring 18. It is understood that the methods shown in FIGS. 2, 4 and 6 do not run only once during the operation of the motor vehicle, but are run repeatedly so that a continuous monitoring of the contact situation at the steering wheel 10 or on the steering wheel ring 18 is possible. Furthermore, it is noted that the described methods can be applied to other operator-controlled elements and in other types of machinery. Examples are the operator-controlled levers of saws, bulldozers, aircraft, et cetera.

What is claimed is:

1. A method for detecting the touch contact of a control element of a machine by a user with which the user controls the machine, the method comprising the steps of:

providing at least one desired vibration characteristic (FR0, PIN0, SIN0) which is present in a defined state of said control element;

during operation, detecting an actual vibration characteristic (FR; PIN; SIN) of said control element which changes in dependence upon a touch contact of the control element by the user;

comparing said actual vibration characteristics (FR, PIN, SIN) to said desired vibration characteristic (FR0; PIN0; SIN0); and, outputting an announcement in dependence upon the result of said comparison.

2. The method of claim 1, wherein the vibration characteristic is the propagation characteristic (SIN) of excited vibrations along at least one region of the control element.

3. The method of claim 2, wherein the control element is excited by a vibration pulse (SOUT) and the time-dependent intensity profile (SIN) of the response vibrations is detected.

4. The method of claim 1, wherein the vibration characteristic is a resonance frequency (FR) of the control element.

5. The method of claim 4, wherein at least one region of the control element is excited in resonance and the actual resonance frequency (FR) of the control element is detected in that the excitation frequency is varied and the maximum of the power output and/or the minimum of the power input is detected.

6. The method of claim 4, wherein at least one region of the control element is excited at a constant frequency and a change of the needed power input (PIN) or the obtained power output and/or a shift of the phase position between excitation and response is detected.

7. The method of claim 1, wherein a conclusion is drawn as to the intensity and/or the nature of the touch contact from the extent and/or of the nature of the deviation of the actual vibration characteristic (FR; PIN; SIN) from the desired vibration characteristic FR0; PIN0; SIN0).

8. The method of claim 1, wherein the desired vibration characteristic (FR0; PIN0; SIN0) is detected and stored in a state of ensured non-contact of the control element by the user.

9. The method of claim 1, wherein the announcement includes the setting of a bit and/or a flag.

10. The method of claim 1, wherein the announcement effects an intervention via an autopilot and/or the output of a warning and/or of an alarm.

11. The method of claim 10, wherein the warning and/or the alarm includes the output of an acoustic signal, the output of an optical signal and/or the generation of sensoric stimuli on the control element, especially vibrations.

12. The method of claim 1, wherein the vibration characteristics (FR; PIN; SIN) in the ultrasonic range or in the infrasonic range are detected or corresponding vibrations (FR0; SIN0) are generated.

13. The method of claim 2, wherein the excitation of the vibrations of the control element and the detection of the vibration characteristics take place with the same device, especially a piezo transducer.

14. A computer program comprising a method which can be carried out when said computer program is run on a computer, the method being for detecting the touch contact of a control element of a machine by a user with which the user controls the machine, the method comprising the steps of:

providing at least one desired vibration characteristic FR0, PIN0, SIN0) which is present in a defined state of said control element;

during operation, detecting an actual vibration characteristic (FR; PIN; SIN) of said control element which changes in dependence upon a touch contact of the control element by the user;

comparing said actual vibration characteristics (FR, PIN, SIN) to said desired vibration characteristic FR0; PIN0; SIN0); and, outputting an announcement in dependence upon the result of said comparison.

15. The computer program of claim 14, wherein it is stored on a memory including a flash memory.

16. A control apparatus (open-loop and/or closed loop) for detecting the touch contact of a control element of a machine by a user with which the user controls the machine, the control apparatus comprising:

means for providing at least one desired vibration characteristic FR0, PIN0, SIN0) which is present in a defined state of said control element;

means for detecting, during operation, an actual vibration characteristic (FR; PIN; SIN) of said control element which changes in dependence upon a touch contact of the control element by the user;

means for comparing said actual vibration characteristics (FR, PIN, SIN) to said desired vibration characteristic FR0; PIN0; SIN0); and, means for outputting an announcement in dependence upon the result of said comparison.

17. The control apparatus (open loop and/or closed loop) of claim 16, wherein said control apparatus includes a computer program for carrying out the method steps of:

providing at least one desired vibration characteristic FR0, PIN0, SIN0) which is present in a defined state of said control element;

during operation, detecting an actual vibration characteristic (FR; PIN; SIN) of said control element which changes in dependence upon a touch contact of the control element by the user;

comparing said actual vibration characteristics (FR, PIN, SIN) to said desired vibration characteristic FR0; PIN0; SIN0); and, outputting an announcement in dependence upon the result of said comparison.

18. An arrangement for detecting the touch contact of a control element of a machine by a user with which the user controls the machine, the arrangement comprising:

a detection device connected to the control element and responding to a touch contact of the control element by the user;

said detection device being so configured that the detection device determines an actual vibration characteristic (FR; PIN; SIN) of the control element which changes in dependence upon a touch contact of the control element by a user during operation;

a data processing unit for comparing the signal of said detecting device to a desired vibration characteristic FR0; PIN0; SIN0) present in a defined state of the control element; and, means for outputting an announcement in dependence upon the result of the comparison.

19. The arrangement of claim 18, wherein the arrangement includes a unit, which is connected to the control element and can excite the control element at a defined vibration (FR, SOUT).

20. The arrangement of claim 19, wherein the excitation unit can output a defined vibration pulse (SOUT) to the control element and a device is provided, with which the time-dependent intensity profile (SIN) of the response vibrations can be detected.

21. The arrangement of claim 19, wherein the excitation unit can excite at least one region of the control element to a resonance vibration (FR).

22. The arrangement of claim 21, wherein a unit is provided which detects the power input (PIN) to the excitation unit.

23. The arrangement of claim 18, wherein said arrangement includes a device for outputting a warning and/or an alarm.

24. The arrangement of claim 19, wherein the excitation unit generates vibrations (FR, SOUT) in the ultrasonic range and/or in the infrasonic range and the detection unit can detect corresponding vibrations (FR, SIN).

25. The arrangement of claim 19, wherein the excitation unit and the detection unit are identical.

26. The arrangement of claim 25, wherein said excitation unit and said detection unit are configured as piezo elements.

27. The combination of an control element of a machine and an arrangement for detecting the touch contact of said control element by a user of said machine with which the user controls the machine, the combination comprising:

said arrangement;

said control element connected to said arrangement;

said arrangement including:

a detection device connected to the control element and responding to a touch contact of the control element by the user;

said detection device being so configured that the detection device determines an actual vibration characteristic (FR; PIN; SIN) of the control element which changes in dependence upon a touch contact of the control element by a user during operation;

a data processing unit for comparing the signal of said detecting device to a desired vibration characteristic FR0; PIN0; SIN0) present in a defined state of the control element; and, means for outputting an announcement in dependence upon the result of the comparison.

28. The combination of claim 27, wherein said arrangement is integrated into the control element.

* * * * *